(12) United States Patent
Wang et al.

(10) Patent No.: US 9,923,823 B2
(45) Date of Patent: Mar. 20, 2018

(54) FLOW CONTROL METHOD AND DEVICE

(71) Applicant: Huawei Technologies Co., Ltd., Shenzhen (CN)

(72) Inventors: Xu Wang, Shenzhen (CN); Qingchun Lin, Beijing (CN); Yusheng Hu, Beijing (CN); Ying Du, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 145 days.

(21) Appl. No.: 14/998,258

(22) Filed: Dec. 24, 2015

(65) Prior Publication Data

US 2016/0134541 A1 May 12, 2016

Related U.S. Application Data

(63) Continuation of application No. PCT/CN2013/078151, filed on Jun. 27, 2013.

(51) Int. Cl.
*H04L 12/26* (2006.01)
*H04L 12/801* (2013.01)
(Continued)

(52) U.S. Cl.
CPC .......... *H04L 47/12* (2013.01); *H04L 12/6418* (2013.01); *H04L 45/74* (2013.01); *H04L 61/2007* (2013.01)

(58) Field of Classification Search
CPC ......... H04L 47/10; H04L 47/35; H04L 47/30; H04L 47/32
See application file for complete search history.

(56) References Cited

U.S. PATENT DOCUMENTS 6,810,421 B1  10/2004  Ishizaki et al.
7,177,947 B1   2/2007  Herzog et al.
(Continued)

FOREIGN PATENT DOCUMENTS

CN        1556634 A    12/2004
CN      101459893 A     6/2009
(Continued)

OTHER PUBLICATIONS

Guichard, J. et al., "Network Service Chaining Problem Statement", Network Working Group, Intended Status: Informational, Jun. 13, 2013, 14 pages.

*Primary Examiner* — Siren Wei
(74) *Attorney, Agent, or Firm* — Slater Matsil, LLP

(57) ABSTRACT

The present invention provides a flow control method and a device. The method includes: obtaining, by a gateway, a data packet of a user; determining N value-added services required by the data packet, where N is an integer greater than or equal to 1; modifying a first IP address in the data packet to an $M^{th}$ IP address in an address sequence, where the first IP address is an IP address of a network server, M is a positive integer greater than or equal to 1, the address sequence is an IP address set allocated by the gateway to the user, and a correspondence exists between an address in the address sequence and a value-added service; sending a modified data packet to a value-added service server corresponding to the $M^{th}$ IP address.

20 Claims, 11 Drawing Sheets

(51) Int. Cl.
*H04L 12/64* (2006.01)
*H04L 12/741* (2013.01)
*H04L 29/12* (2006.01)

(56) References Cited

U.S. PATENT DOCUMENTS

| | | | |
|---|---|---|---|
| 2002/0009079 A1* | 1/2002 | Jungck | H04L 29/12066 370/389 |
| 2002/0052915 A1* | 5/2002 | Amin-Salehi | H04Q 11/0407 709/203 |
| 2002/0101848 A1* | 8/2002 | Lee | H04L 29/06 370/349 |
| 2003/0108052 A1 | 6/2003 | Inoue et al. | |
| 2005/0289244 A1* | 12/2005 | Sahu | H04L 67/2819 709/249 |
| 2012/0166657 A1 | 6/2012 | Toumura | |
| 2013/0029708 A1 | 1/2013 | Fox et al. | |

FOREIGN PATENT DOCUMENTS

| | | |
|---|---|---|
| CN | 102131239 A | 7/2011 |
| EP | 2538719 A2 | 12/2012 |
| JP | 2000209212 A | 7/2000 |
| JP | 2002269061 A | 9/2002 |
| JP | 2003174473 A | 6/2003 |
| JP | 2012134780 A | 7/2012 |
| JP | 2013105308 A | 5/2013 |

\* cited by examiner

FLOW CONTROL METHOD AND DEVICE

This application is a continuation of International Application No. PCT/CN2013/078151, filed on Jun. 27, 2013, which is hereby incorporated by reference in its entirety.

TECHNICAL FIELD

The present invention relates to communications technologies, and in particular, to a flow control method and a device.

BACKGROUND

With development of the Internet and non-traditional operators, global telecom operators are under great impact, which results in a decrease in a value of average revenue per user (APRU for short) and a decrease in customer viscosity. The telecom operators hope to resolve the foregoing problem by using a solution of deploying a value-added service. Relatively commonly-used value-added services include video optimization, website (WEB for short) optimization, advertisement insertion, antivirus, and the like. A server that performs value-added service processing is a VAS (Value Added Service) server. When multiple VAS servers with different functions are simultaneously deployed in series in a network, each data packet needs to pass through all VAS servers, and each VAS server needs to identify, by means of deep packet analysis, a data packet that the VAS server needs to process, and then process the data packet that has been identified, which requires each VAS server to have a high packet processing capability, and therefore, investment costs of the operators increase, and a network delay and a possibility that a fault occurs increase.

SUMMARY

Embodiments of the present invention provide a flow control method and a device, which effectively reduce a network delay and a possibility that a fault occurs.

According to a first aspect, an embodiment of the present invention provides a flow control method, including: obtaining, by a gateway, a data packet of a user; determining N value-added services required by the data packet, where N is a positive integer greater than or equal to 1; modifying a first IP address in the data packet to an $M^{th}$ IP address in an address sequence, where the first IP address is an IP address of a network server, M is a positive integer greater than or equal to 1, the address sequence is an IP address set allocated by the gateway to the user, and a correspondence exists between an address in the address sequence and a value-added service; sending a modified data packet to a value-added service server corresponding to the $M^{th}$ IP address, so that the value-added service server corresponding to the $M^{th}$ IP address performs value-added service processing on the modified data packet; and receiving a data packet on which the value-added service processing has been performed, and modifying the first IP address to the IP address of the network server.

In a first possible implementation manner of the first aspect of the present invention, the obtaining, by a gateway, a data packet of a user specifically includes: receiving, by the gateway, an uplink data packet sent by the user to the network server; or receiving, by the gateway, a downlink data packet sent by the network server to the user.

In a second possible implementation manner of the first aspect of the present invention, before the modifying the first IP address to the IP address of the network server, the method further includes: determining whether the required N value-added services are all completed; if the required N value-added services are all completed, performing the step of modifying the first IP address to the IP address of the network server; and if the required N value-added services are not all completed, changing a value of M, and performing the step of modifying a first IP address in the data packet to an $M^{th}$ IP address in an address sequence.

In a third possible implementation manner of the first aspect of the present invention, before the obtaining, by a gateway, a data packet of a user, the method further includes allocating an address sequence to the user, where one IP address in the address sequence is visible to the user, and other IP addresses are invisible to the user.

With reference to the third possible implementation manner of the first aspect of the present invention, in a fourth possible implementation manner of the first aspect of the present invention, after the allocating an address sequence to the user, the method further includes establishing a correspondence between the N value-added services and an IP address that is invisible to the user and in the address sequence.

According to a second aspect, an embodiment of the present invention provides a gateway device, including: an obtaining module, configured to obtain a data packet of a user; a determining module, configured to determine N value-added services that are required by the data packet obtained by the obtaining module, where N is a positive integer greater than or equal to 1; a modifying module, configured to modify a first IP address in the data packet obtained by the obtaining module to the $M^{th}$ IP address in an address sequence, where the first IP address is an IP address of a network server, M is a positive integer greater than or equal to 1, the address sequence is an IP address set allocated by the gateway to the user, and a correspondence exists between an address in the address sequence and a value-added service; a sending module, configured to send a data packet obtained after being modified by the modifying module to a value-added service server corresponding to the $M^{th}$ IP address, so that the value-added service server corresponding to the $M^{th}$ IP address performs value-added service processing on the modified data packet; a receiving module, configured to receive a data packet on which the value-added service processing has been performed; and a restoration module, configured to modify the first IP address in the data packet that is received by the receiving module to the IP address of the network server.

In a first possible implementation manner of the second aspect of the present invention, the obtaining module is specifically configured to: receive an uplink data packet sent by the user to the network server; or receive a downlink data packet sent by the network server to the user.

In a second possible implementation manner of the second aspect of the present invention, the gateway device further includes: a judging module, configured to: before the restoration module modifies the first IP address in the data packet that is received by the receiving module to the IP address of the network server, determine whether the required N value-added services are all completed; the restoration module is specifically configured to: if a determining result of the judging module is that the required N value-added services are all completed, perform the step of modifying the first IP address in the data packet that is received by the receiving module to the IP address of the network server; and the modifying module is further configured to: if the determining result of the judging module is that the required N value-added services are not all completed, change a value of M, and perform the step of modifying a first IP address in the data packet to an $M^{th}$ IP address in an address sequence.

In a third possible implementation manner of the second aspect of the present invention, the gateway device further includes an allocation module, configured to allocate an address sequence to the user, where one IP address in the address sequence is visible to the user, and other IP addresses are invisible to the user.

With reference to the third possible implementation manner of the second aspect of the present invention, in a fourth possible implementation manner of the second aspect of the present invention, the gateway device further includes an establishing module, configured to establish a correspondence between the N value-added services and an IP address that is invisible to the user and in the address sequence.

According to a third aspect, an embodiment of the present invention provides a gateway device, including: a first receiver, configured to obtain a data packet of a user; a first processor, configured to determine N value-added services required by the data packet, and modify a first IP address in the data packet to an $M^{th}$ IP address in an address sequence, where N is a positive integer greater than or equal to 1, M is a positive integer greater than or equal to 1, the first IP address is an IP address of a network server, the address sequence is an IP address set allocated by the gateway to the user, and a correspondence exists between an address in the address sequence and a value-added service; a transmitter, configured to send a modified data packet to a value-added service server corresponding to the $M^{th}$ IP address, so that the value-added service server corresponding to the $M^{th}$ IP address performs value-added service processing on the modified data packet; a second receiver, configured to receive a data packet on which the value-added service processing has been performed; and a second processor, configured to modify the first IP address in the data packet that is received by the second receiver to the IP address of the network server.

In a first possible implementation manner of the third aspect of the present invention, the first receiver is specifically configured to: receive an uplink data packet sent by the user to the network server; or receive a downlink data packet sent by the network server to the user.

In a second possible implementation manner of the third aspect of the present invention, the first processor is further configured to: before modifying the first IP address to the IP address of the network server, determine whether the required N value-added services are all completed; if the required N value-added services are all completed, perform the step of modifying the first IP address to the IP address of the network server; and if the required N value-added services are not all completed, change a value of M, and perform the step of modifying a first IP address in the data packet to an $M^{th}$ IP address in an address sequence.

In a third possible implementation manner of the third aspect of the present invention, the gateway device further includes a third processor, configured to allocate an address sequence to the user, where one IP address in the address sequence is visible to the user, and other IP addresses are invisible to the user.

With reference to the third possible implementation manner of the third aspect of the present invention, in a fourth possible implementation manner of the third aspect of the present invention, the third processor is further configured to establish a correspondence between the N value-added services and an IP address that is invisible to the user and in the address sequence.

According to the solutions provided in the embodiments of the present invention, a gateway is used to complete identification of all SA, and send a packet on which value-added service processing needs to be performed to a specified VAS server, which reduces flows that the VAS server needs to process, saves a service identification process of the VAS server, and reduces costs that an operator invests on the VAS server.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
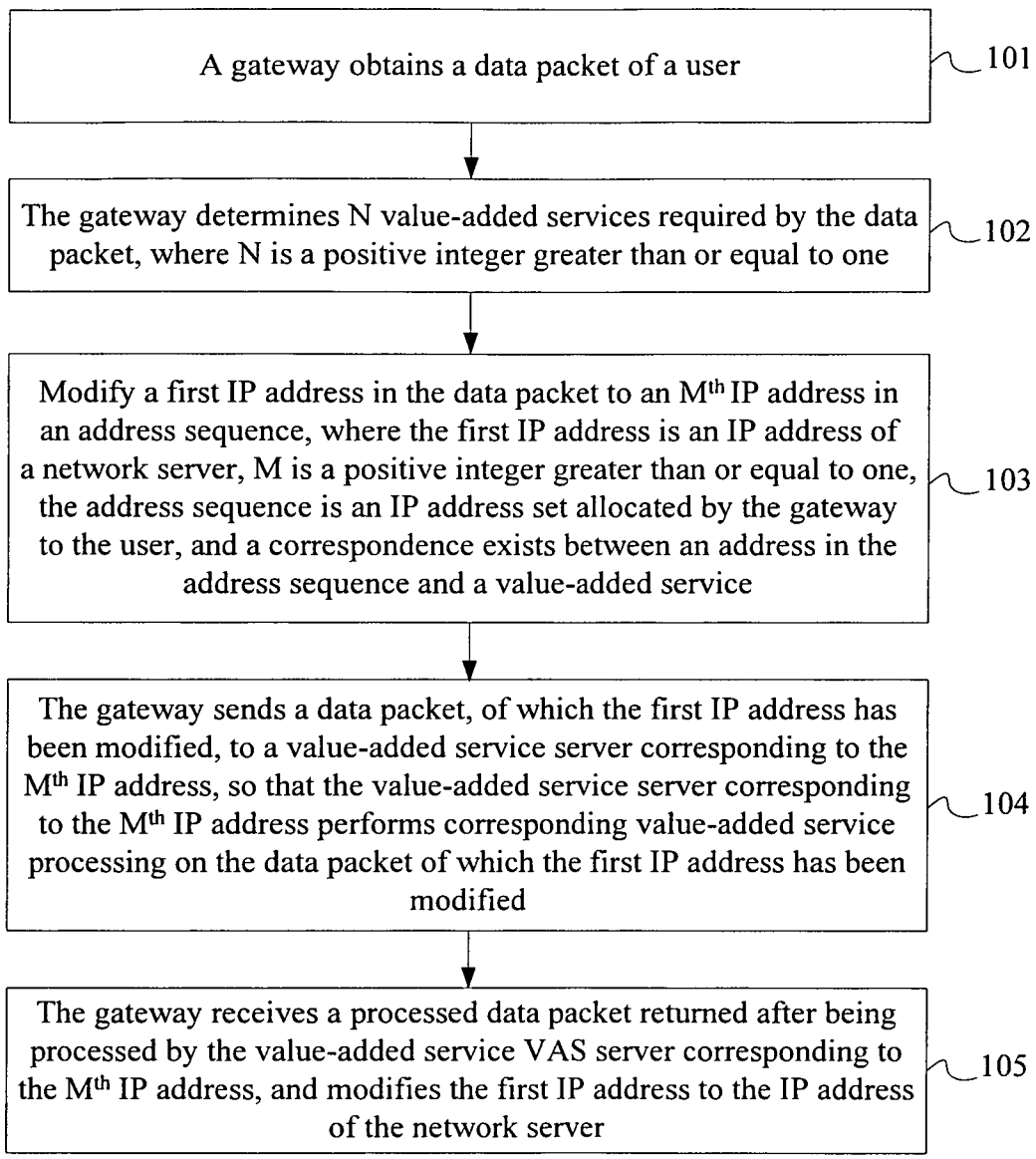
FIG. 1 is a flowchart of a flow control method according to Embodiment 1 of the present invention.

FIG. 1 is a flowchart of a flow control method according to Embodiment 1 of the present invention. As shown in FIG. 1, the method includes the following steps.

101. A gateway obtains a data packet of a user.

The gateway described herein may be but is not limited to a gateway GPRS support node (GGSN for short), a packet data network gateway (P-GW for short), and the like.

The data packet of the user described herein may be an uplink data packet sent by the user to a network server, or may be a downlink data packet sent by a network server to the user.

102. The gateway determines N value-added services required by the data packet, where N is a positive integer greater than or equal to 1.

It should be noted herein that as a service awareness (SA for short) engine and a service centralized distribution point, the gateway (such as a GGSN/P-GW) may identify subscription information of the user, access information of the user, service flow information, and the like. Therefore, a value-added service required by the data packet may be determined according to the subscription information of the user, the access information of the user, the service flow information, and the like. There may be one value-added service, or may be two or more value-added services, which is not limited herein. The value-added service may be but is not limited to video optimization processing, Web optimization, advertisement insertion, antivirus processing, and the like.

103. Modify a first IP address in the data packet to an $M^{th}$ IP address in an address sequence, where the first IP address is an IP address of a network server, M is a positive integer greater than or equal to 1, the address sequence is an IP address set allocated by the gateway to the user, and a correspondence exists between an address in the address sequence and a value-added service.

The address sequence described herein is an address set allocated by the gateway to each user during IP address allocation. One IP address in the address set is visible to the user, and is also an IP address used by the user. Other IP addresses are invisible to the user, and are mainly used to complete control of the data packet of the user. For allocation of the address sequence, the following is an example for description: when the user activates a request, an IP address allocated to the user is 101.123.0.1, and the address is visible to the user, and is delivered to a user terminal by using an activation response; in addition, in the local GGSN/P-GW, 101.123.0.2-101.123.0.10 are all allocated to the user, but are invisible to the user. The address sequence is used to complete the control of the data packet of the user.

It should further be noted that for the uplink data packet, the IP address of the network server is a destination IP address of the data packet; for the downlink data packet, the IP address of the network server is a source IP address of the data packet.

104. The gateway sends a data packet whose first IP address has been modified to a value-added service server corresponding to the $M^{th}$ IP address, so that the value-added service server corresponding to the $M^{th}$ IP address performs corresponding value-added service processing on the data packet whose first IP address has been modified.

105. The gateway receives a processed data packet returned after being processed by the value-added service VAS server corresponding to the $M^{th}$ IP address, and modifies the first IP address to the IP address of the network server.

According to the flow control method provided in this embodiment of the present invention, a gateway is used to complete identification of all SA, and send a packet on which value-added service processing needs to be performed to a specified VAS server, which reduces flows that the VAS server needs to process, saves a service identification process of the VAS server, and reduces costs that an operator invests on the VAS server.

Figure 2:
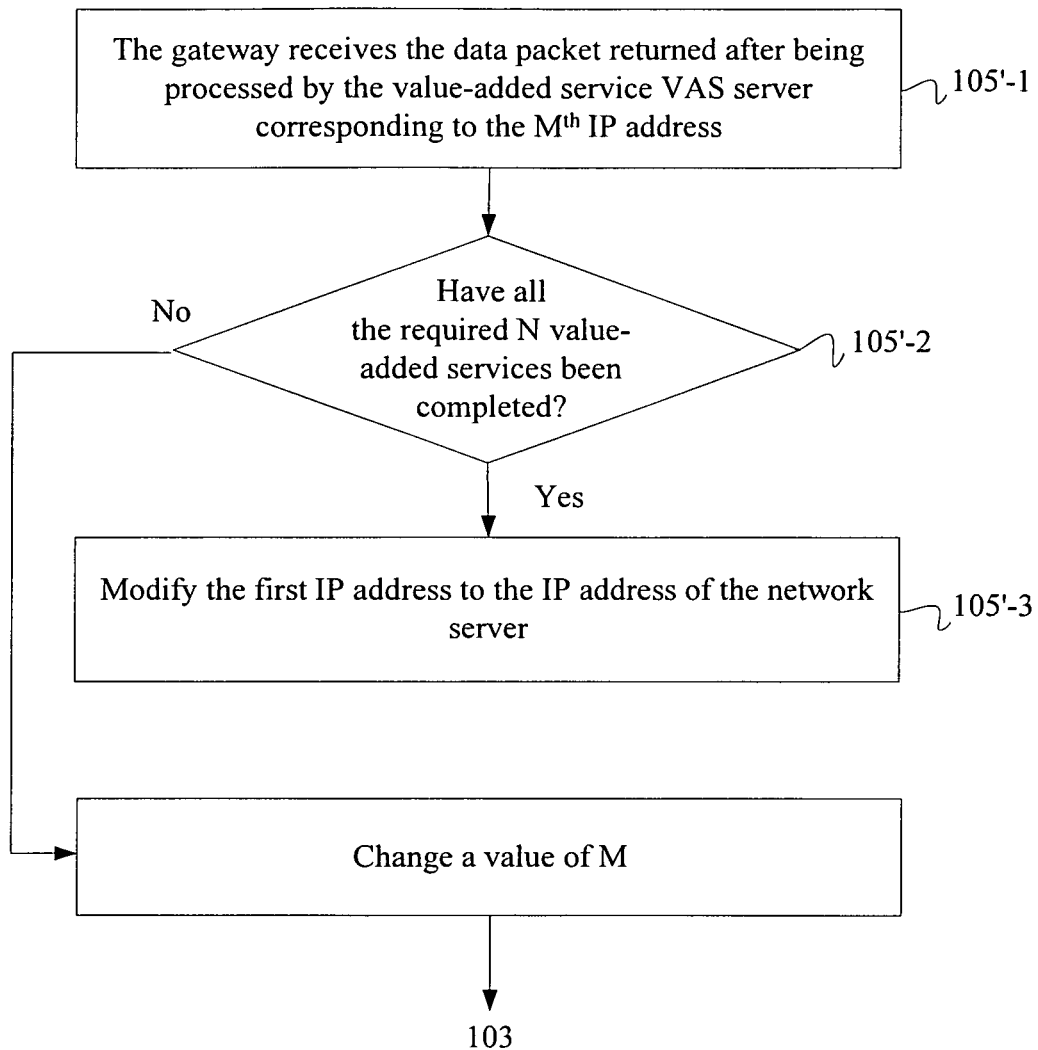
FIG. 2 is another implementation manner of step 105 in the foregoing embodiment according to an embodiment of the present invention.

On the basis of the foregoing embodiment, FIG. 2 is another implementation manner of step 105 in the foregoing embodiment according to an embodiment of the present invention.

105'-1. The gateway receives the data packet returned after being processed by the value-added service VAS server corresponding to the $M^{th}$ IP address.

105'-2. Determine whether all the required N value-added services have been completed in the data packet that has been processed.

If all the required N value-added services have been completed, 105'-3 is performed; and if not all the required N value-added services have been completed, 105'-4 is performed.

105'-3. Modify the first IP address to the IP address of the network server.

105'-4. Change a value of M, and perform step 103.

The foregoing steps that replace step 105 may effectively ensure that all the required N value-added services may be processed in each data packet.

Figure 3:
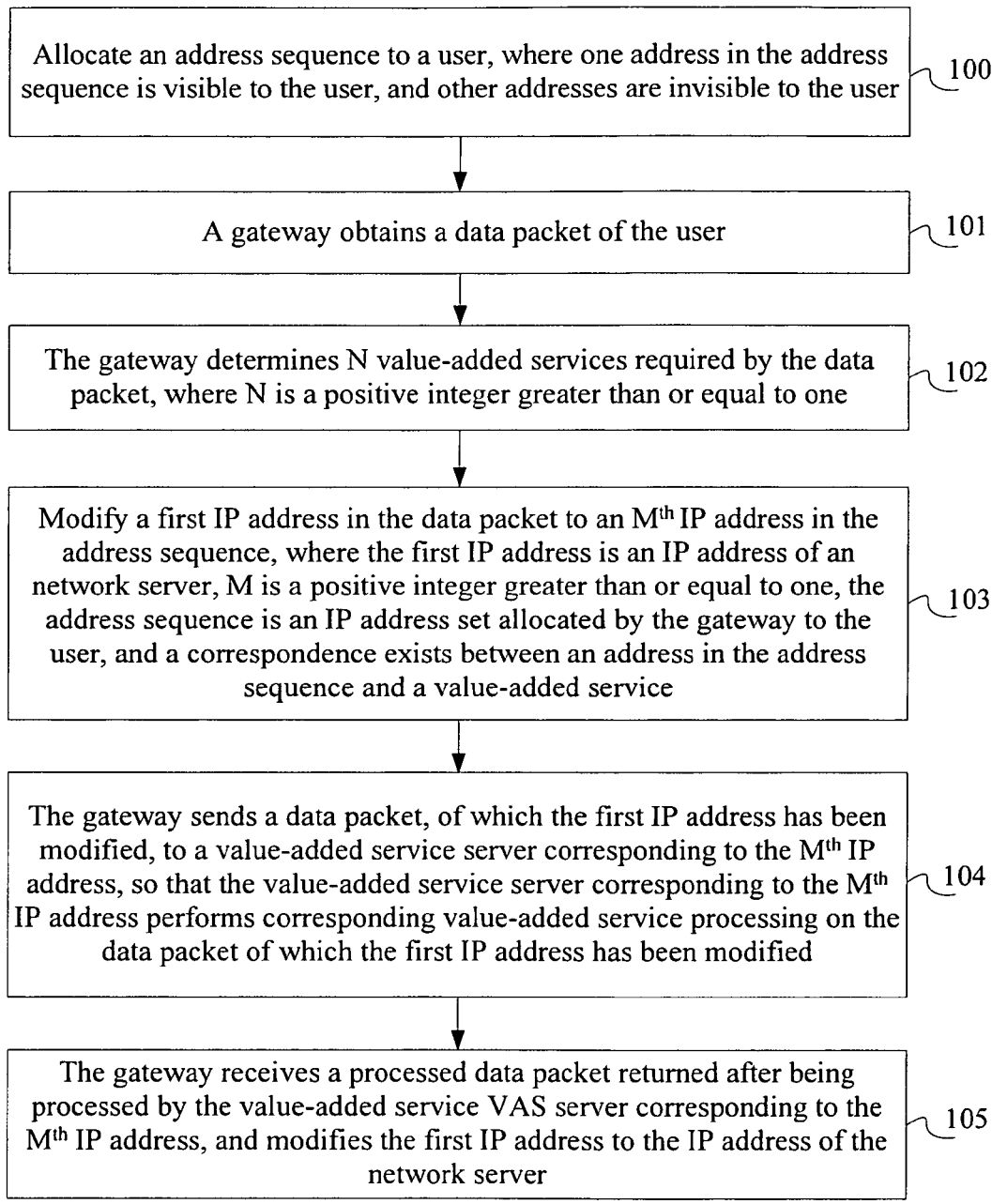
FIG. 3 is another flowchart of the flow control method according to Embodiment 1 of the present invention.

On the basis of the foregoing first or second implementation manner, as shown in FIG. 3, before step 101, the method may further include step 100.

100. Allocate an address sequence to a user, where one address in the address sequence is visible to the user, and other addresses are invisible to the user.

An IP address that is visible to the user is used to be allocated to the user for use as the IP address, and an address that is invisible to the user is reserved for the user. The addresses that are invisible to the user actually represent gateways. That is, when the first IP address in the data packet is modified to one of the IP addresses that are invisible to and reserved for the user in step 103, after completing processing of the data packet, the VAS server returns the processed data packet to the gateway, so as to facilitate further processing by the gateway.

Therefore, to facilitate processing by the gateway, a correspondence may be established between the $M^{th}$ address in the foregoing address sequence and the $M^{th}$ value-added service. In this way, when it is determined that processing of the $M^{th}$ value-added service is performed on the data packet of the user, the $M^{th}$ IP address corresponding to the $M^{th}$ value-added service is directly used. The gateway may know, according to the first IP address in the processed data packet that is received, a VAS server, responsible for which value-added service, that returns the packet. Therefore, it may be quickly determined that which value-added service processing has been performed on the processed data packet, so that it may be effectively determined that the processed data packet further needs which value-added service processing, whether all the value-added service processing has been completed, and the like.

For allocation of the address sequence, it should further be noted herein that, for an operator that uses a private address pool, because the private address pool may be planned by the operator itself, it may be considered that allocation of an address sequence of the user does not need additional costs. In this case, an IP address sequence may be allocated directly according to planning of an IP address pool of the user. For example, it is assumed that the data packet is allowed to pass through a maximum of four different types of VAS servers, and then an interval between IP addresses allocated to users may be five, which is shown as follows:

| | |
|---|---|
| 192.168.0.1 | an actual address of user 1 (visible to the user) |
| 192.168.0.2 | service control address 1 of user 1 (invisible to the user) |

| | |
|---|---|
| 192.168.0.3 | service control address 2 of user 1 (invisible to the user) |
| 192.168.0.4 | service control address 3 of user 1 (invisible to the user) |
| 192.168.0.5 | service control address 4 of user 1 (invisible to the user) |
| 192.168.0.6 | an actual address of user 2 (visible to the user) |
| 192.168.0.7 | service control address 1 of user 2 (invisible to the user) |
| 192.168.0.8 | service control address 2 of user 2 (invisible to the user) |
| 192.168.0.9 | service control address 3 of user 2 (invisible to the user) |
| 192.168.0.10 | service control address 4 of user 2 (invisible to the user) |
| ... | |

For an operator that uses a public address pool, the operator needs to purchase the address pool in this case. Therefore, it may be considered that allocation of the address sequence of the user is limited and has cost pressure. When data packet exchange is performed between the GGSN/P-GW and the VAS server, purposes of replacing the IP address by the GGSN/P-GW is: to identify that a routing destination IP address of the packet is the gateway itself, rather than others, which facilitates completion of data packet control; and to identify a location at which the packet is processed in a value-added service action chain, thereby preventing repeated processing or an endless loop of the packet. In this case, a private address pool may be added as an IP address sequence resource pool for data packet control, and gateway routes of the public and private address pools are both configured as the gateway itself. The following two methods may be used as allocation methods of the private address pool that is set for the value-added service processing.

The first method: allocating a private address sequence pool of the value-added services to each user, where when different users perform a same value-added service, destination IP addresses of uplink packets (source IP addresses of downlink packets) are different. For example, it is assumed that the data packet is allowed to pass through a maximum of four different types of VAS servers, as shown below:

| | |
|---|---|
| 101.123.0.1 | an actual address of user 1 |
| 192.168.0.1 | service control address 1 of user 1 |
| 192.168.64.1 | service control address 2 of user 1 |
| 192.168.128.1 | service control address 3 of user 1 |
| 192.168.192.1 | service control address 4 of user 1 |
| 101.123.0.2 | an actual address of user 2 |
| 192.168.0.2 | service control address 1 of user 2 |
| 192.168.64.2 | service control address 2 of user 2 |
| 192.168.128.2 | service control address 3 of user 2 |
| 192.168.192.2 | service control address 4 of user 2 |
| ... | |

Note: Address segment masks are as follows:

| Xxxxxxxx. | Xxxxxxxx. | Xxxxxxxx. | Xxxxxxxx | |
|---|---|---|---|---|
| 01100101. | 01111011. | 00000000. | 00000001 | 101.123.0.1 |
| 11000000. | 10101000. | 00000000. | 00000001 | 192.168.0.1 |
| 11000000. | 10101000. | 01000000. | 00000001 | 192.168.64.1 |
| 11000000. | 10101000. | 10000000. | 00000001 | 192.168.128.1 |
| 11000000. | 10101000. | 11000000. | 00000001 | 192.168.192.1 |

The second method: allocating a private address sequence pool of the value-added services to all the users, where when different users perform a same value-added service, destination IP addresses of uplink packets (source IP addresses of downlink packets) are the same. For example, it is assumed that the data packet is allowed to pass through a maximum of four different types of VAS servers, as shown below:

| | |
|---|---|
| 101.123.0.1 | an actual address of user 1 |
| 192.168.0.1 | service control address 1 of all the users |
| 192.168.0.2 | service control address 2 of all the users |
| 192.168.0.3 | service control address 3 of all the users |
| 192.168.0.4 | service control address 4 of all the users |
| 101.123.0.2 | an actual address of user 2 |
| 192.168.0.1 | service control address 1 of all the users |
| 192.168.0.2 | service control address 2 of all the users |
| 192.168.0.3 | service control address 3 of all the users |
| 192.168.0.4 | service control address 4 of all the users |
| ... | |

In one implementation manner, it is assumed that there are three value-added services in a system: VAS 1, VAS 2, and VAS 3, when a user (UE 1) is activated, a gateway (GGSN/P-GW) allocates an IP address sequence 101.123.0.1-101.123.0.4 to the user, and an IP address of a network server (Internet Server) is 10.1.1.1. An uplink data packet is used as an example in this embodiment to describe the method, but is not intended to limit the protection scope of the present invention.

Figure 4:
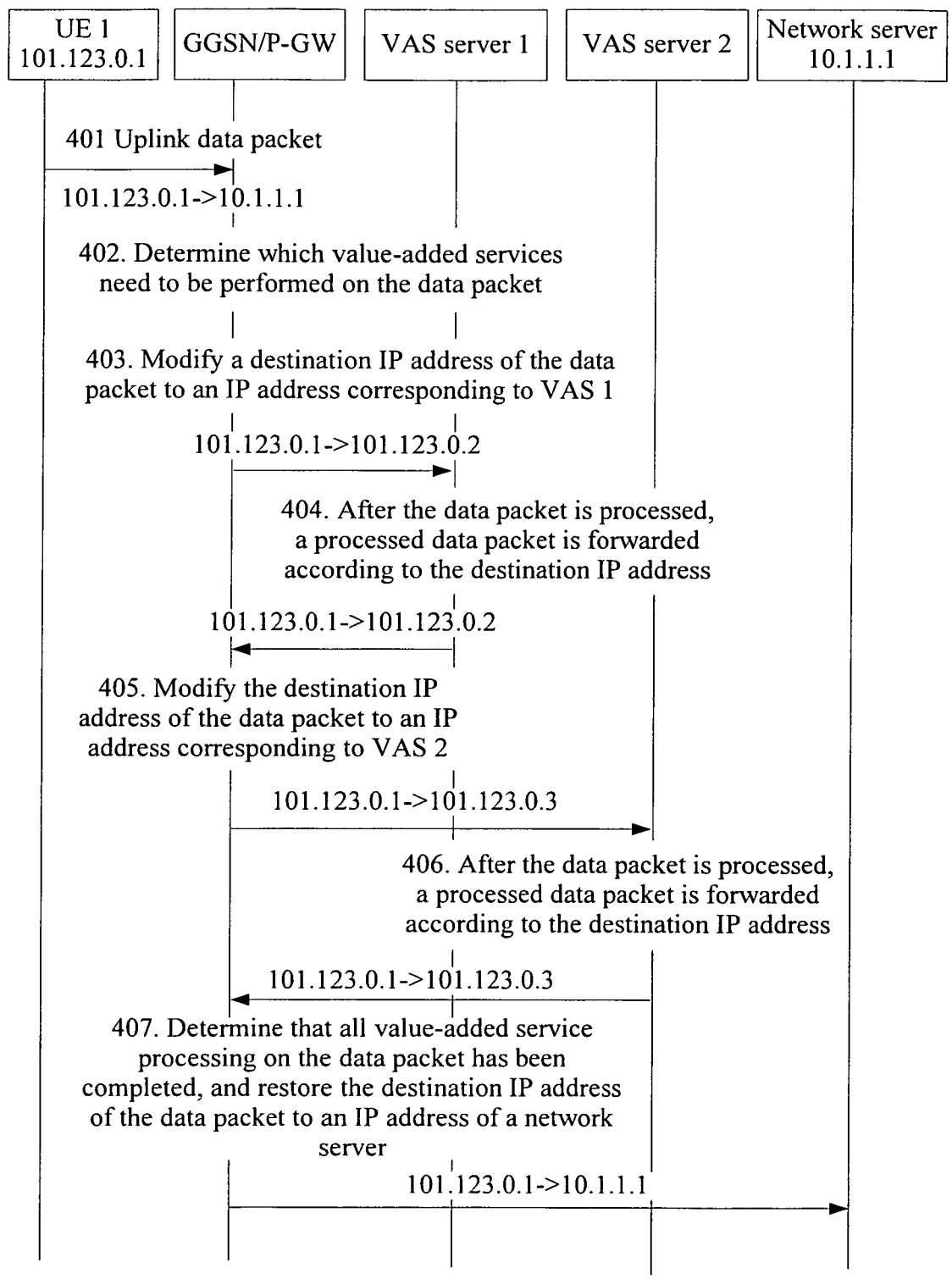
FIG. 4 is a signaling interworking diagram of a flow control method according to Embodiment 2 of the present invention.

FIG. 4 is a signaling interworking diagram of a flow control method according to Embodiment 2 of the present invention. As shown in FIG. 4, specifically, the method includes:

401. A UE 1 (whose visible IP address is 101.123.0.1) sends a data packet to the network server (whose IP address is 10.1.1.1), and the GGSN/P-GW receives the data packet.

402. The GGSN/P-GW determines, according to subscription information of the user, access information of the user, and service flow information that are obtained when the UE 1 is activated, which value-added services need to be performed on the data packet. For example, it is determined that the uplink data packet needs to be first processed by VAS 1, then processed by VAS 2, and then sent to the network server.

403. The GGSN/P-GW modifies a destination IP address of the uplink data packet to the second IP address (an IP address corresponding to VAS 1) in the IP address sequence that is allocated by the GGSN/P-GW to the user, and sends the uplink data packet to a server of VAS 1 (that is, VAS Server 1). That is, a source IP address of the packet sent by the GGSN/P-GW to VAS Server 1 is 101.123.0.1, and a destination IP address is 101.123.0.2.

404. After VAS Server 1 processes the data packet, a processed data packet is forwarded according to the destination IP address 101.123.0.2, and then is forwarded back to the GGSN/P-GW according to network segment routing.

405. After receiving the data packet returned by VAS Server 1, the GGSN/P-GW determines, according to the destination IP address (101.123.0.2) of the data packet, that the data packet has completed processing by VAS 1 and continues to perform processing by VAS 2. Then, the GGSN/P-GW modifies the destination IP address of the data packet to the third IP address (an IP address corresponding to VAS 2) in the IP address sequence that is allocated by the GGSN/P-GW to the user, and sends the data packet to a server of VAS 2 (VAS Server 2). That is, a source IP address of the data packet sent by the GGSN/P-GW to VAS Server 2 is 101.123.0.1, and a destination IP address is 101.123.0.3.

406. After VAS Server 2 processes the data packet, a processed data packet is forwarded according to the destination IP address 101.123.0.3, and then is forwarded back to the GGSN/P-GW according to the network segment routing.

407. After receiving the data packet returned by VAS Server 2, the GGSN/P-GW determines, according to the destination IP address (101.123.0.3) of the data packet, that the data packet has completed processing by VAS 2, that is, all value-added service processing on the uplink data packet has been completed; restores the destination IP address of the uplink data packet to 10.1.1.1, and forwards an uplink data packet whose destination IP address has been restored to the network server.

In another implementation manner, it is assumed that there are three value-added services in a system: VAS 1, VAS 2, and VAS 3, when a user (UE 1) is activated, a gateway (GGSN/P-GW) allocates an IP address sequence 101.123.0.1-101.123.0.4 to the user, and an IP address of a network server (Internet Server) is 10.1.1.1. A downlink data packet is used as an example in this embodiment to describe the method, but is not intended to limit the protection scope of the present invention.

Figure 5:
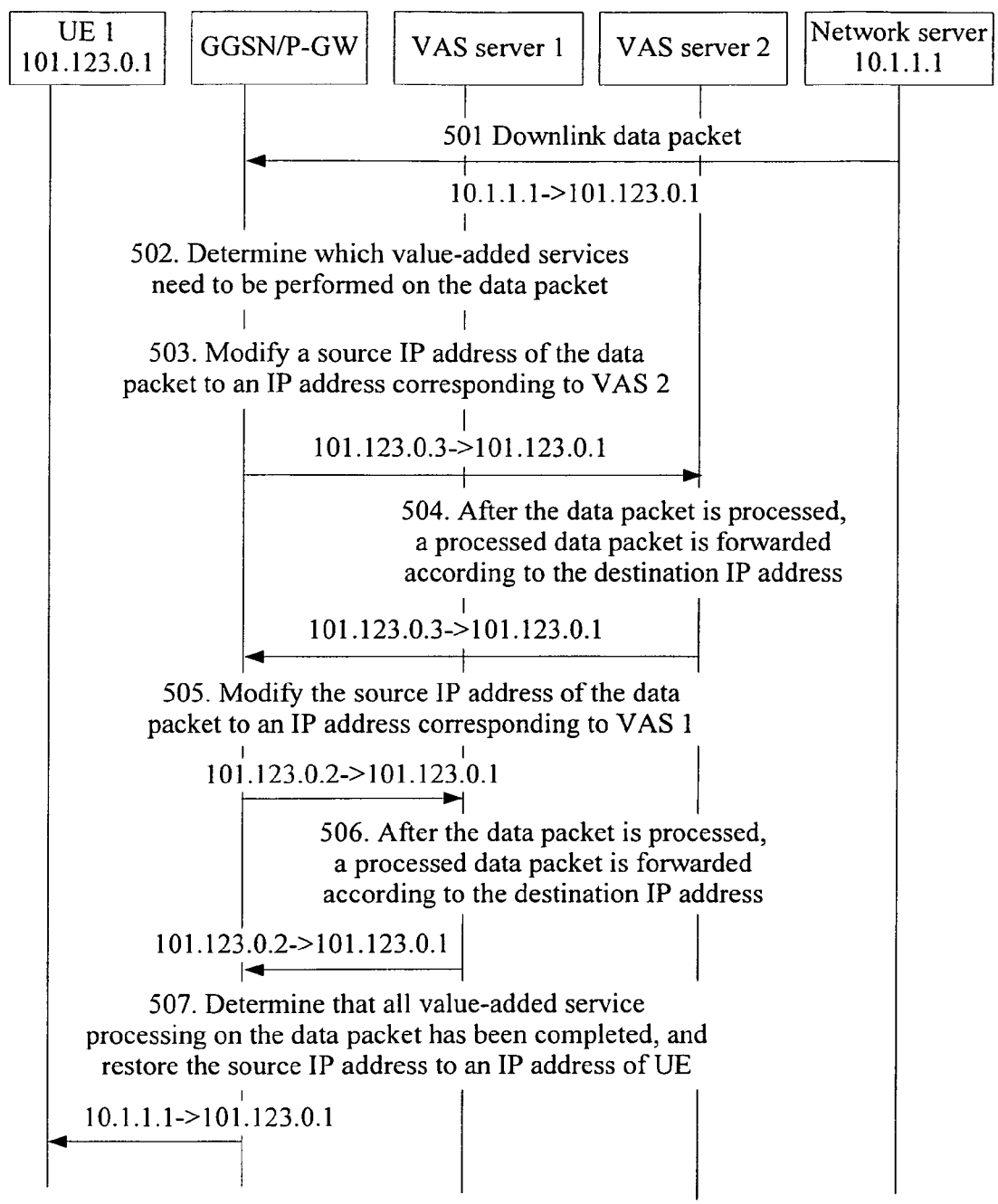
FIG. 5 is a signaling interworking diagram of a flow control method according to Embodiment 3 of the present invention.

FIG. 5 is a signaling interworking diagram of a flow control method according to Embodiment 3 of the present invention. As shown in FIG. 5, specifically, the method includes the following steps.

501. The network server (whose IP address is 10.1.1.1) sends a data packet to a UE 1 (whose visible IP address is 101.123.0.1), and the GGSN/P-GW receives the data packet.

502. The GGSN/P-GW determines, according to subscription information of the user, access information of the user, and service flow information that are obtained when the UE 1 is activated, which value-added services need to be performed on the data packet. For example, it is determined that the downlink data packet needs to be first processed by VAS 2, then processed by VAS 1, and then sent to the user.

503. The GGSN/P-GW modifies a source IP address of the downlink data packet to the third IP address (an IP address corresponding to VAS 2) in the IP address sequence that is allocated by the GGSN/P-GW to the user, and sends the downlink data packet to a server of VAS 2 (VAS Server 2). That is, a source IP address of the packet sent by the GGSN/P-GW to VAS Server 2 is 101.123.0.3, and a destination IP address is 101.123.0.1.

504. After VAS Server 2 processes the data packet, a processed data packet is forwarded according to the destination IP address 101.123.0.1, and then is forwarded back to the GGSN/P-GW according to network segment routing.

505. After receiving the data packet returned by VAS Server 2, the GGSN/P-GW determines, according to the source IP address (101.123.0.3) of the data packet, that the data packet has completed processing by VAS 2 and continues to perform processing by VAS 1. Then, the GGSN/P-GW modifies the source IP address of the data packet to the second IP address (an IP address corresponding to VAS 1) in the IP address sequence that is allocated by the GGSN/P-GW to the user, and sends the data packet to a server of VAS 1 (VAS Server 1). That is, a source IP address of the data packet sent by the GGSN/P-GW to VAS Server 1 is 101.123.0.2, and a destination IP address is 101.123.0.1.

506. After VAS Server 1 processes the data packet, a processed data packet is forwarded according to the destination IP address 101.123.0.1, and then is forwarded back to the GGSN/P-GW according to the network segment routing.

507. After receiving the data packet returned by VAS Server 1, the GGSN/P-GW determines, according to the source IP address (101.123.0.2) of the data packet, that the data packet has completed processing by VAS 1, that is, all value-added service processing on the downlink data packet has been completed; restores the source IP address of the downlink data packet to 10.1.1.1, and sends a downlink data packet whose source IP address has been restored to the user.

According to the flow control method provided in this embodiment of the present invention, a gateway is used to complete identification of all SA, and send a packet on which value-added service processing needs to be performed to a specified VAS server, which reduces flows that the VAS server needs to process, saves a service identification process of the VAS server, and reduces costs that an operator invests on the VAS server.

Figure 6:
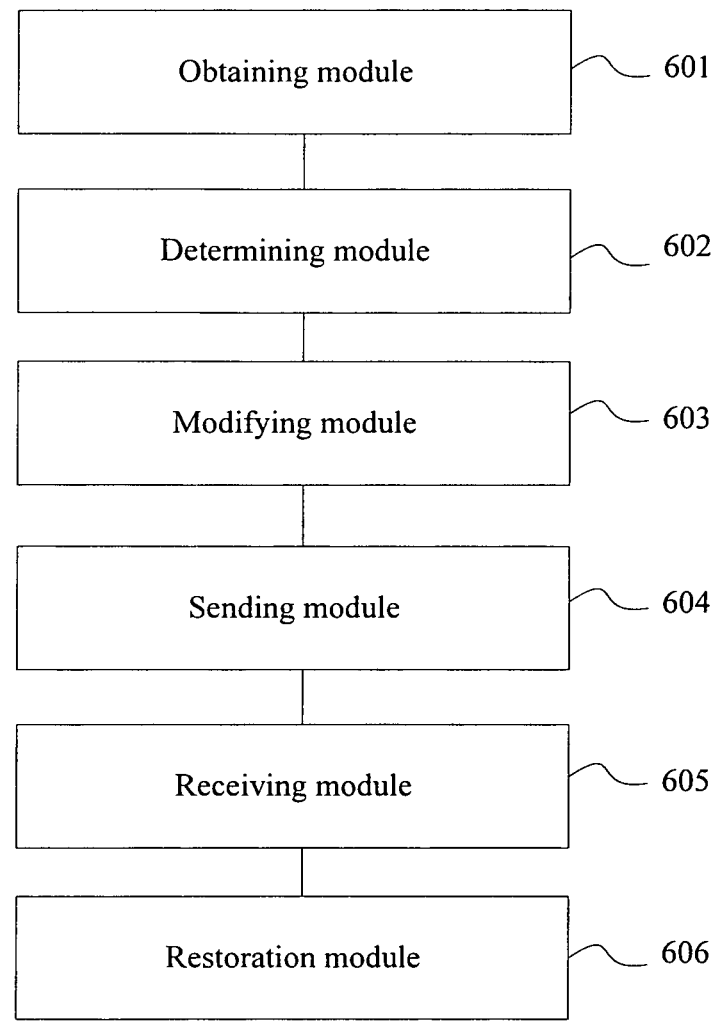
FIG. 6 is a schematic structural diagram of a gateway device according to Embodiment 4 of the present invention.

FIG. 6 is a schematic structural diagram of a gateway device according to Embodiment 4 of the present invention. It should be noted that the gateway device is one of the execution bodies in the foregoing method embodiments, and for a specific working procedure of the gateway device, reference may be made to the method embodiments, and details are not described herein again. As shown in FIG. 6, the gateway device includes an obtaining module 601, a determining module 602, a modifying module 603, a sending module 604, a receiving module 605, and a restoration module 606. The obtaining module 601 is configured to obtain a data packet of a user; the determining module 602 is configured to determine N value-added services that are required by the data packet obtained by the obtaining module 601, where N is a positive integer greater than or equal to 1; the modifying module 603 is configured to modify a first IP address in the data packet obtained by the obtaining module 601 to the $M^{th}$ IP address in an address sequence, where the first IP address is an IP address of a network server, M is a positive integer greater than or equal to 1, the address sequence is an IP address set allocated by the gateway to the user, and a correspondence exists between an address in the address sequence and a value-added service; the sending module 604 is configured to send a data packet obtained after being modified by the modifying module 603 to a value-added service server corresponding to the $M^{th}$ IP address, so that the value-added service server corresponding to the $M^{th}$ IP address performs value-added service processing on the modified data packet; the receiving module 605 is configured to receive a data packet on which the value-added service processing has been performed; the restoration module 606 is configured to modify the first IP address in the data packet that is received by the receiving module 605 to the IP address of the network server.

In one implementation manner, the obtaining module 601 is specifically configured to: receive an uplink data packet sent by the user to the network server; or receive a downlink data packet sent by the network server to the user.

Figure 7:
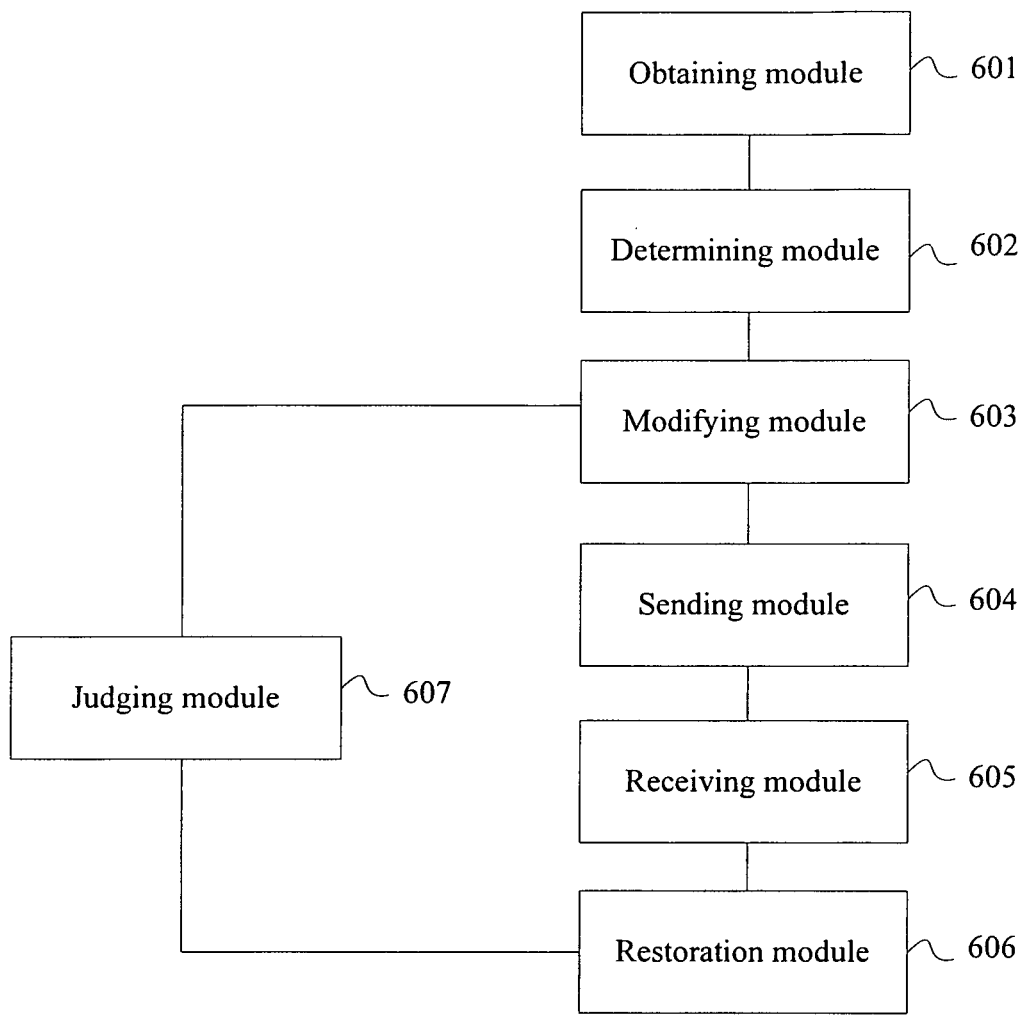
FIG. 7 is another schematic structural diagram of the gateway device according to Embodiment 4 of the present invention.

Another schematic structural diagram of the gateway device according to Embodiment 4 of the present invention is shown in FIG. 7. The gateway device further includes: a judging module 607, configured to: before the restoration module 606 modifies the first IP address in the data packet to the IP address of the network server, determine whether the required N value-added services are all completed; the restoration module 606 is specifically configured to: if a determining result of the judging module 607 is that the required N value-added services are all completed, perform the step of modifying the first IP address in the data packet that is received by the receiving module 605 to the IP address of the network server; the modifying module 603 is further configured to: if the determining result of the judging module 607 is that the required N value-added services are not all completed, change a value of M, and perform the step of modifying a first IP address in the data packet to an $M^{th}$ IP address in an address sequence.

Figure 8:
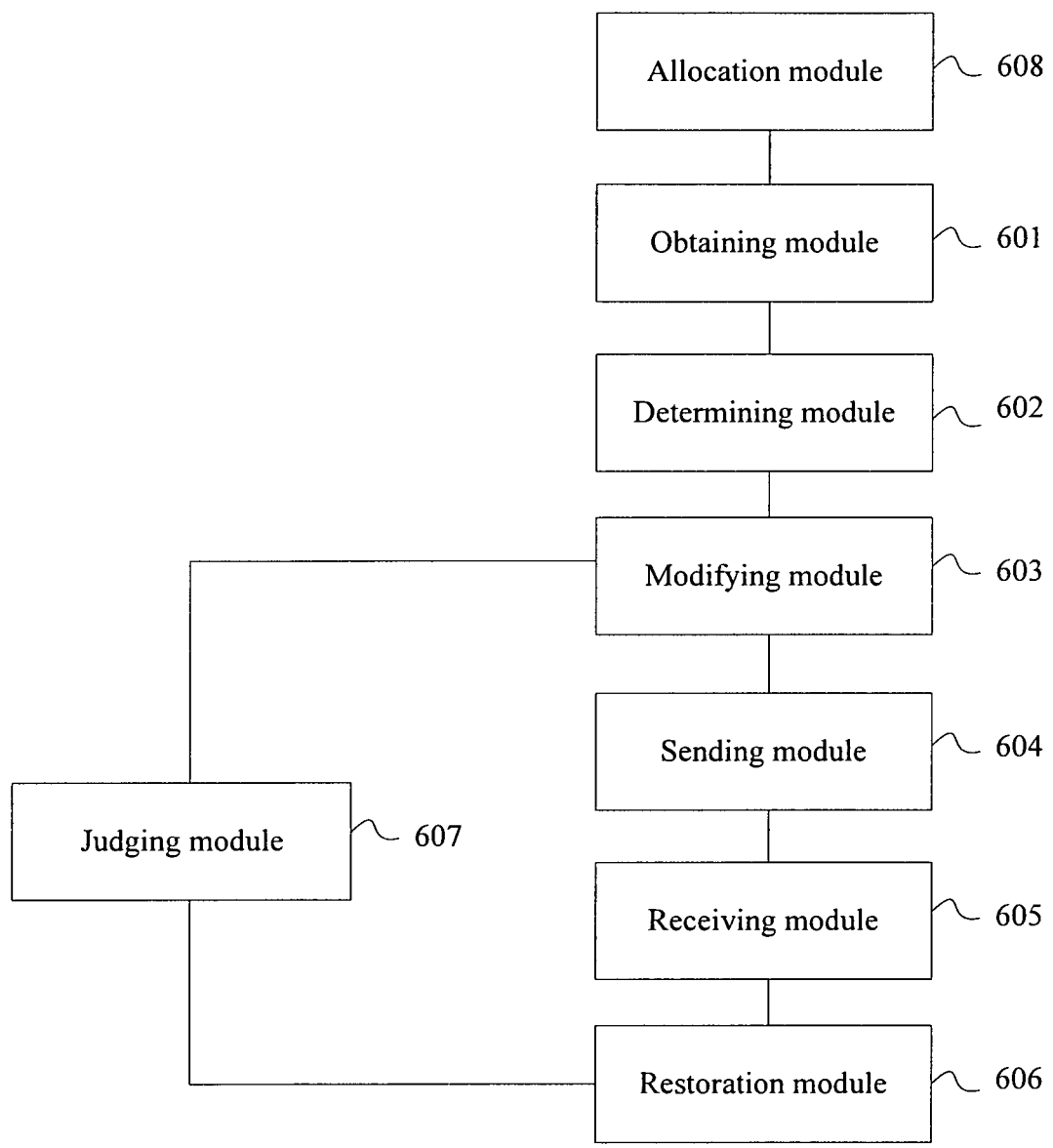
FIG. 8 is still another schematic structural diagram of the gateway device according to Embodiment 4 of the present invention.

Still another schematic structural diagram of the gateway device according to Embodiment 4 of the present invention is shown in FIG. 8. The gateway device further includes: an allocation module 608, configured to allocate an address sequence to the user, where one IP address in the address sequence is visible to the user, and other IP addresses are invisible to the user.

Figure 9:
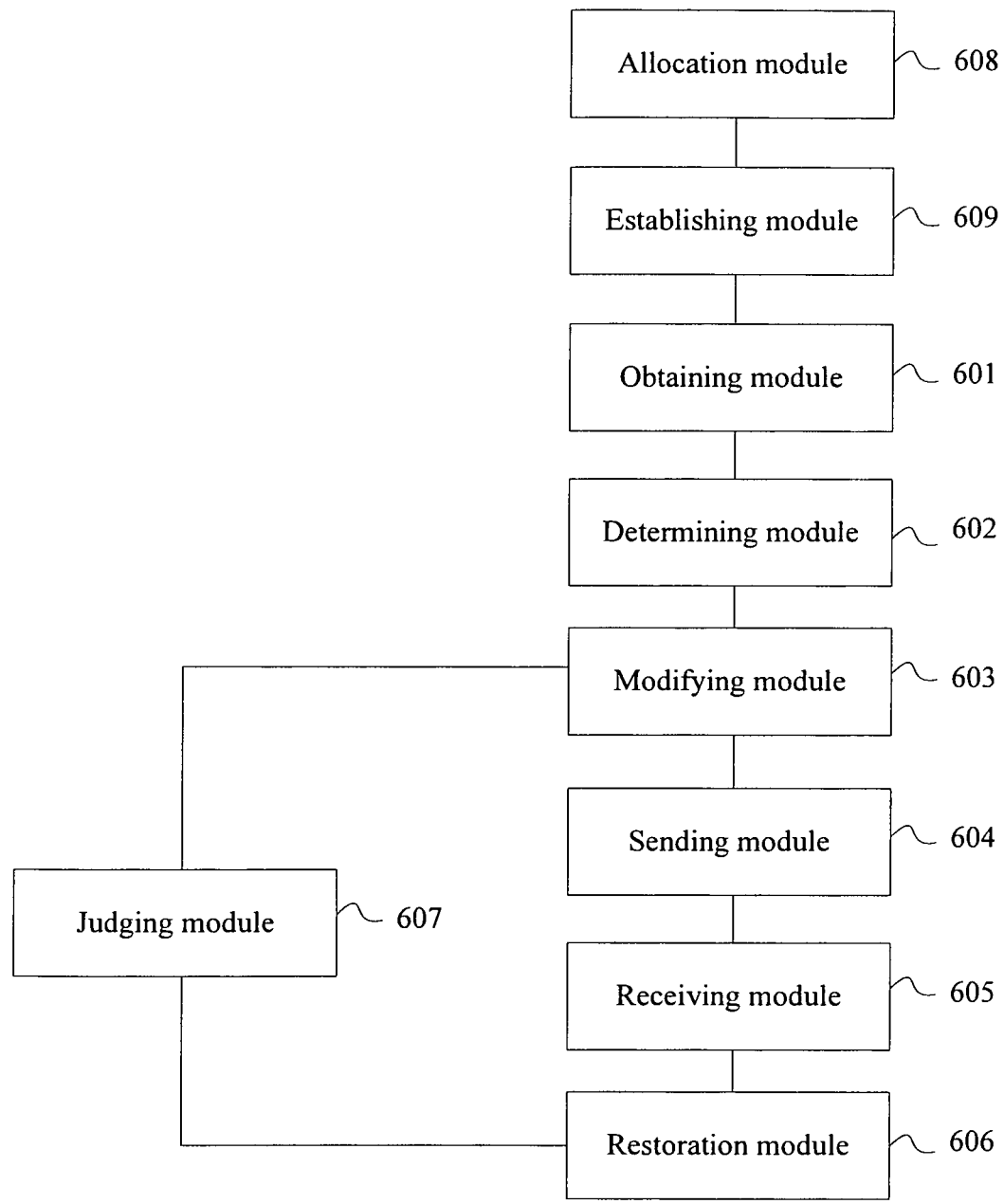
FIG. 9 is yet another schematic structural diagram of the gateway device according to Embodiment 4 of the present invention.

Yet another schematic structural diagram of the gateway device according to Embodiment 4 of the present invention is shown in FIG. 9. The gateway device further includes: an establishing module 609, configured to establish a correspondence between N value-added services and an IP address that is invisible to the user and in the address sequence.

According to the gateway device provided in this embodiment of the present invention, identification of all SA is completed, and a packet on which value-added service processing needs to be performed is sent to a specified VAS server, which reduces flows that the VAS server needs to process, saves a service identification process of the VAS server, and reduces costs that an operator invests on the VAS server.

Figure 10:
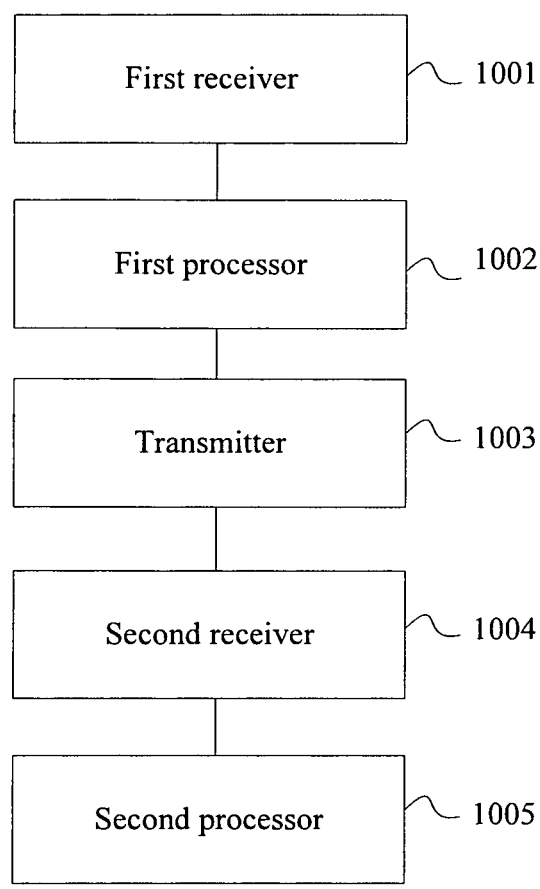
FIG. 10 is a schematic structural diagram of a gateway device according to Embodiment 5 of the present invention.

FIG. 10 is a schematic structural diagram of a gateway device according to Embodiment 5 of the present invention. It should be noted that the gateway device is one of the execution bodies in the foregoing method embodiments, and for a specific working procedure of the gateway device, reference may be made to the method embodiments, and details are not described herein again. As shown in FIG. 10, the gateway device includes: a first receiver 1001, configured to obtain a data packet of a user; a first processor 1002, configured to determine N value-added services required by the data packet, and modify a first IP address in the data packet to an $M^{th}$ IP address in an address sequence, where N is a positive integer greater than or equal to 1; M is a positive integer greater than or equal to 1, the first IP address is an IP address of a network server, the address sequence is an IP address set allocated by the gateway to the user, and a correspondence exists between an address in the address sequence and a value-added service; a transmitter 1003, configured to send a modified data packet to a value-added service server corresponding to the $M^{th}$ IP address, so that the value-added service server corresponding to the $M^{th}$ IP address performs value-added service processing on the modified data packet; a second receiver 1004, configured to receive a data packet on which the value-added service processing has been performed; and a second processor 1005, configured to modify the first IP address in the data packet that is received by the second receiver to the IP address of the network server.

In one implementation manner, the first receiver 1001 is specifically configured to: receive an uplink data packet sent by the user to the network server; or receive a downlink data packet sent by the network server to the user.

In another implementation manner, the first processor 1002 is further configured to: before modifying the first IP address to the IP address of the network server, determine whether the required N value-added services are all completed; if the required N value-added services are all completed, perform the step of modifying the first IP address to the IP address of the network server; if the required N value-added services are not all completed, change a value of M, and perform the step of modifying a first IP address in the data packet to an $M^{th}$ IP address in an address sequence.

Figure 11:
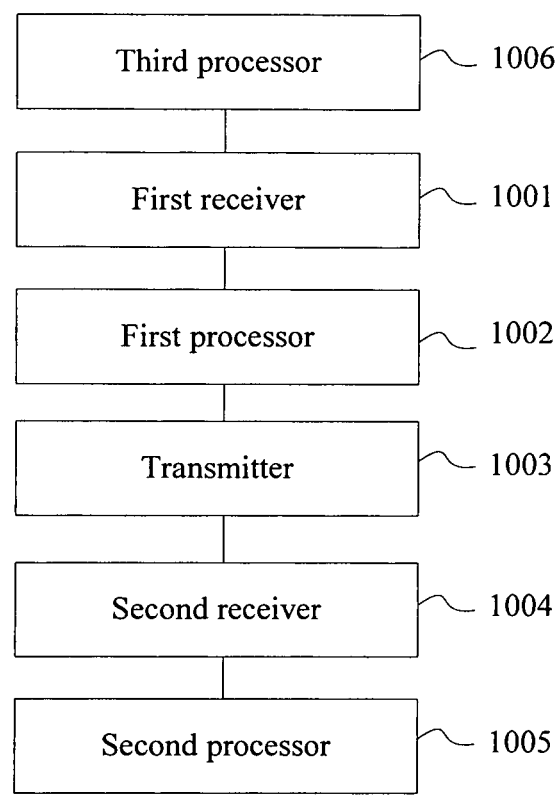
FIG. 11 is another schematic structural diagram of the gateway device according to Embodiment 5 of the present invention.

FIG. 11 is another schematic structural diagram of the gateway device according to Embodiment 5 of the present invention. The gateway device further includes: a third processor 1006, configured to allocate an address sequence to the user, where one IP address in the address sequence is visible to the user, and other IP addresses are invisible to the user.

On the basis of the foregoing embodiment, the third processor 1006 is further configured to establish a correspondence between the N value-added services and an IP address that is invisible to the user and in the address sequence.

According to the gateway device provided in this embodiment of the present invention, identification of all SA is completed, and a packet on which value-added service processing needs to be performed is sent to a specified VAS server, which reduces flow that the VAS server needs to process, saves a service identification process of the VAS server, and reduces costs that an operator invests on the VAS server.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A flow control method, comprising:
   obtaining, by a gateway, a data packet of a user terminal;
   determining required N value-added services that are required by the data packet, wherein N is an integer greater than or equal to 1;
   performing, when at least one of the required N value-added services are not completed, each of:
      determining a value of M according to a performance order of the required N value-added services and further according to one or more correspondences, wherein M is an integer greater than or equal to 1, wherein the one or more correspondences comprise a correspondence between each internet protocol (IP) address in an address sequence and each value-added service, wherein the address sequence is an IP address set allocated by the gateway to the user terminal;
      setting a value of a first IP address field in the data packet to be an $M^{th}$ IP address in the address sequence to generate a set data packet;
      sending the set data packet to a value-added service server corresponding to the $M^{th}$ IP address, the sending the data packet to the value-added service server causing the value-added service server to perform value-added service processing on the set data packet;
      receiving a processed data packet on which the value-added service processing has been performed;
      changing the value of M according to the performance order of the required N value-added services and further according to the one or more correspondences in response to at least one of the required N value-added services not being completed, and performing, using the processed data packet, the setting the value of the first IP field address, the sending the set data packet, and the receiving the processed data packet; and setting the value of the first IP address field to be an IP address of the network server in response to determining that each of the required N value-added services are completed.

2. The method according to claim 1, wherein obtaining the data packet of the user terminal comprises receiving, by the gateway, an uplink data packet sent by the user terminal to the network server.

3. The method according to claim 1, wherein obtaining the data packet of the user terminal comprises receiving, by the gateway, a downlink data packet sent by the network server to the user terminal.

4. The method according to claim 1, wherein the method further comprises allocating an address sequence to the user before the obtaining the data packet of the user terminal, wherein one IP address in the address sequence is visible to the user terminal, and other IP addresses in the address sequence are invisible to the user terminal.

5. The method according to claim 4, wherein the method further comprises establishing, after allocating the address sequence to the user terminal, the one or more correspondences between the N value-added services and an IP address that is invisible to the user equipment and in the address sequence.

6. A gateway device comprising a computer including a non-transitory computer-readable storage medium storing program modules executable by the computer, the modules including:

an obtaining module, configured to obtain a data packet of a user terminal;

a determining module, configured to determine required N value-added services that are required by the data packet obtained by the obtaining module, wherein N is an integer greater than or equal to 1, and further configured to determine a value of M according to a performance order of the required N value-added services and further according to one or more correspondences, wherein M is an integer greater than or equal to 1, wherein the one or more correspondences comprise a correspondence between each internet protocol (IP) address in an address sequence and each value-added service, and wherein the address sequence is an IP address set allocated by the gateway to the user terminal;

a modifying module, configured to set a value of a first IP address field in the data packet to be the $M^{th}$ IP address in the address sequence to generate a set data packet;

a sending module, configured to send the set data packet to a value-added service server corresponding to the $M^{th}$ IP address, the sending the set data packet to the value-added service server causing the value-added service server to perform value-added service processing on the set data packet;

a receiving module, configured to receive a processed data packet on which the value-added service processing has been performed;

wherein the gateway is further configured to change the value of M according to the performance order of the required N value-added services and further according to the one or more correspondences in response to at least one of the required N value-added services not being completed, and perform, use the processed data packet, the setting the value of the first IP field address, the sending the set data packet, and the receiving the process data; and a restoration module, configured to set the value of the first IP address field in the data packet that is received by the receiving module to be an IP address of the network server in response to determining that each of the required N value-added services are completed.

7. The gateway device according to claim 6, wherein the obtaining module is configured to receive an Uplink Data packet sent by the user terminal to the network server.

8. The gateway device according to claim 6, wherein the obtaining module is configured to receive a downlink data packet sent by the network server to the user terminal.

9. The gateway device according to claim 6, further comprising an allocation module, configured to allocate an address sequence to the user terminal, wherein one IP address in the address sequence is visible to the user terminal, and other IP addresses in the address sequence are invisible to the user terminal.

10. The gateway device according to claim 9, further comprising an establishing module, configured to establish a correspondence between the N value-added services and an IP address that is invisible to the user terminal and in the address sequence.

11. A gateway device, comprising:

a receiver;

a processor coupled to the receiver;

a non-transitory compute readable storage medium coupled to the processor and storing a program to be executed by the processor; and a transmitter coupled to the processor;

wherein the receiver is configured to obtain a data packet of a user equipment;

wherein the program including instructions to:

determine required N value-added services that are required by the data packet, wherein N is an integer greater than or equal to 1; and perform, when at least one of the required N value-added services are not completed, each of:

determine a value of M according to a performance order of the required N value-added services and further according to one or more correspondences, wherein M is an integer greater than or equal to 1, wherein the one or more correspondences comprise a correspondence between each internet protocol (IP) address in an address sequence and each value-added service, wherein the address sequence is an IP address set allocated by the gateway to the user terminal; and set a value of a first IP address field in the data packet to be an $M^{th}$ IP address in the address sequence to generate a set data packet;

cause the transmitter to send the set data packet to a value-added service server corresponding to the $M^{th}$ IP address, the sending the data packet to the value-added service server causing the value-added service server to perform value-added service processing on the set data packet;

cause the receiver to receive a processed data packet on which the value-added service processing has been performed; and change the value of M according to the performance order of the required N value-added services and further according to the one or more correspondences in response to at least one of the required N value-added services not being completed, and perform, use the processed data packet, the setting the value of the first IP field address, the sending the set data packet, and the receiving the processed data packet;

wherein the program further includes instructions to set the value of the first IP address field in the data packet that is received by the receiver to be an IP address of the network server in response to determining that each of the required N value-added services are completed.

12. The gateway device according to claim 11, wherein the receiver is configured to receive an uplink data packet sent by the user terminal to the network server or to receive a downlink data packet sent by the network server to the user terminal.

13. The gateway device according to claim 11, wherein program further includes instructions to allocate an address sequence to the user terminal, wherein one IP address in the address sequence is visible to the user terminal and other IP addresses in the address sequence are invisible to the user terminal.

14. The gateway device according to claim 13, wherein the processor is further configured to establish a correspondence between the N value-added services and an IP address that is invisible to the user terminal and in the address sequence.

15. The method according to claim 1, wherein the IP address of the network server is a destination IP address of the data packet and the data packet is an uplink data packet.

16. The method according to claim 1, wherein the IP address of the network server is a source IP address of the data packet and the data packet is a downlink data packet.

17. The gateway device according to claim 6, wherein the IP address of the network server is a destination IP address of the data packet and the data packet is an uplink data packet.

18. The gateway device according to claim 6, wherein the IP address of the network server is a source IP address of the data packet and the data packet is a downlink data packet.

19. The gateway device according to claim 11, wherein the IP address of the network server is a destination IP address of the data packet and the data packet is an uplink data packet.

20. The gateway device according to claim 11, wherein the IP address of the network server is a source IP address of the data packet and the data packet is a downlink data packet.

\* \* \* \* \*